(12) United States Patent
Southwood et al.

(10) Patent No.: US 11,755,758 B1
(45) Date of Patent: Sep. 12, 2023

(54) SYSTEM AND METHOD FOR EVALUATING DATA FILES

(71) Applicant: Amazon Technologies, Inc., Reno, NV (US)

(72) Inventors: Scott Southwood, Seattle, WA (US); Canku Alp Calargun, Redmond, WA (US); Brett Lounsbury, Phoenix, AZ (US); Prajwal Yadapadithaya, Seattle, WA (US); Ankit Garg, Seattle, WA (US); Chih-Jen Huang, Issaquah, WA (US); Vivek Chaganti, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 216 days.

(21) Appl. No.: 15/798,050

(22) Filed: Oct. 30, 2017

(51) Int. Cl.
*G06F 21/62* (2013.01)
*G06V 30/413* (2022.01)
*G06V 30/19* (2022.01)
*G06V 30/414* (2022.01)
*G06V 30/418* (2022.01)

(52) U.S. Cl.
CPC ...... *G06F 21/6218* (2013.01); *G06V 30/19073* (2022.01); *G06V 30/413* (2022.01); *G06V 30/414* (2022.01); *G06V 30/418* (2022.01)

(58) Field of Classification Search
CPC ... G06K 9/4638; G06T 5/50; H04N 2201/3225; H04N 1/00244; G06F 16/50
See application file for complete search history.

(56) References Cited

U.S. PATENT DOCUMENTS

| | | | | |
|---|---|---|---|---|
| 6,643,383 | B1* | 11/2003 | Dugelay | G06T 1/0028 358/3.28 |
| 2005/0021994 | A1* | 1/2005 | Barton et al. | G06F 21/562 726/26 |
| 2005/0071283 | A1* | 3/2005 | Randle et al. | G06Q 20/04 705/75 |
| 2006/0013486 | A1* | 1/2006 | Burns et al. | G06K 9/4642 382/195 |
| 2007/0011183 | A1* | 1/2007 | Langseth et al. | G06F 16/313 |
| 2007/0081694 | A1* | 4/2007 | Ryan, Jr. | G07D 7/20 382/100 |
| 2007/0286451 | A1* | 12/2007 | Rhoads | G06T 1/0064 382/100 |

(Continued)

OTHER PUBLICATIONS

Clark et al., Digital Forensics Tool Testing - Image Metadata in the Cloud, 2011, Department of Computer Science and Media Technology Gjøvik University College.*

*Primary Examiner* — Guillermo M Rivera-Martinez
(74) *Attorney, Agent, or Firm* — Hogan Lovells US LLP

(57) ABSTRACT

Various embodiments provide processes for identification of embedded unauthorized data within document data. Such processes may include evaluating document data properties for indications of closing headers, comparing document data sizes against reference sizes, and comparing document data sizes against other document data sizes. Certain embodiments evaluating image data may evaluate image properties, such as histograms or gradient images, to determine random or otherwise unauthorized data. Upon detection of unauthorized data, the document data may be flagged for later processing, such as removal from a storage server.

20 Claims, 11 Drawing Sheets

(56) References Cited

U.S. PATENT DOCUMENTS

| | | | | |
|---|---|---|---|---|
| 2008/0125067 | A1* | 5/2008 | Bells et al. | H04W 4/00 455/187.1 |
| 2009/0019074 | A1* | 1/2009 | Hino | H04N 1/32101 |
| 2009/0257671 | A1* | 10/2009 | Fridrich et al. | G06K 9/00577 382/260 |
| 2010/0113091 | A1* | 5/2010 | Sharma | G06K 9/4642 455/556.1 |
| 2010/0220364 | A1* | 9/2010 | Picard et al. | G03G 21/046 358/3.28 |
| 2010/0232765 | A1* | 9/2010 | Suginohara et al. | G10H 1/00 386/239 |
| 2010/0235392 | A1* | 9/2010 | McCreight et al. | G06F 21/645 707/780 |
| 2011/0025710 | A1* | 2/2011 | Kennedy et al. | G06T 11/60 345/629 |
| 2011/0216975 | A1* | 9/2011 | Rother et al. | G06K 9/34 382/173 |
| 2012/0327450 | A1* | 12/2012 | Sagan et al. | G03G 21/046 358/1.14 |
| 2014/0079297 | A1* | 3/2014 | Tadayon et al. | G06K 9/00 382/118 |
| 2014/0211979 | A1* | 7/2014 | Kawazu | G06T 1/0028 382/100 |
| 2014/0241629 | A1* | 8/2014 | Lerios et al. | G06T 9/00 382/166 |
| 2017/0093798 | A1* | 3/2017 | McKinion | H04L 63/0281 |
| 2017/0193594 | A1* | 7/2017 | Glasgow et al. | G06T 7/00 |
| 2017/0372322 | A1* | 12/2017 | Morey et al. | G06K 9/64 |
| 2018/0101751 | A1* | 4/2018 | Ghosh et al. | G06K 9/6274 |
| 2018/0107887 | A1* | 4/2018 | Huber, Jr. et al. | G06K 9/00449 |
| 2018/0173993 | A1* | 6/2018 | Cogranne et al. | G06K 9/22 |
| 2018/0232605 | A1* | 8/2018 | Chen et al. | G06N 3/08 |
| 2018/0336362 | A1* | 11/2018 | Guttmann | G06N 20/00 |
| 2018/0351969 | A1* | 12/2018 | MacLeod et al. | H04L 63/145 |
| 2018/0365819 | A1* | 12/2018 | Green | G06T 7/0002 |

* cited by examiner

SYSTEM AND METHOD FOR EVALUATING DATA FILES

BACKGROUND

Users are increasingly utilizing off-site or cloud storage to store digital data files, such as documents, photographs, videos, or music. Often, a cloud storage host will provide storage for a nominal fee or offer storage of certain data file formats at different rates. Some users may attempt to disguise data files in different file formats to circumvent the cost structure presented by the host. For hosts experiencing significant traffic, it may be difficult to verify that each data file being transmitted by a user is the file format the user has assigned to it. Hosts may rely on their terms of service to prevent users from disguising data files, but identification and remediation may be difficult and resource intensive.

BRIEF DESCRIPTION OF THE DRAWINGS

Various embodiments in accordance with the present disclosure will be described with reference to the drawings, in which:

FIGS. 7A-7D illustrate a graphical representation of a histogram, in accordance with various embodiments.

DETAILED DESCRIPTION

Figure 1:
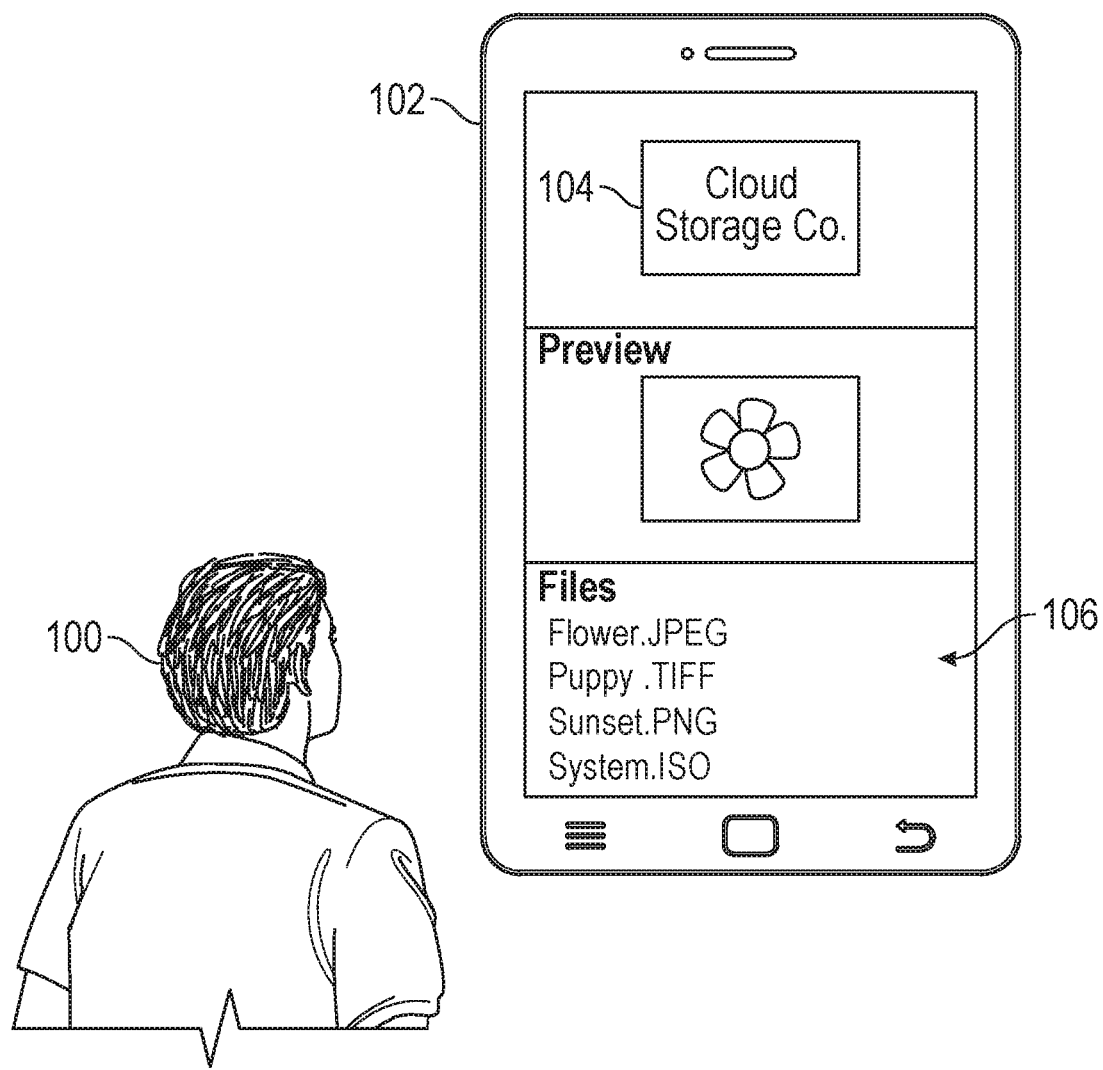
FIG. 1 illustrates an example scenario in which various embodiments of the present disclosure can be utilized.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in determining the presence of unauthorized data in document data. In particular, various embodiments provide for document data verification by evaluating document data for unauthorized data. Such evaluation may include determining whether unauthorized data has been concatenated or otherwise embedded into authorized document data. When unauthorized data is identified, the document data may be flagged for later action, removed from a cloud storage server, or otherwise isolated or processed. Further, users intentionally circumventing terms of service by including unauthorized data into document data may be notified or have their privileges with the cloud storage server revoked or otherwise affected.

In various embodiments, document data may be transmitted to a cloud storage server by an application executing on a client device. A user of the client device may have a customer account with a cloud storage host or other such content provider that provides a cloud storage service for storing and accessing document data. The user may be an authorized user having permission per a user policy to store document data on the cloud storage server for later retrieval. Document data can correspond to, for example, a data type, such as an image file, executable program, video file, music file, or any other type of format for storing electronic data. Certain cloud storage hosts may charge a nominal fee based on quantity of storage required, data type stored, bandwidth utilized, or other such usage metric. For example, because certain data types may be associated with smaller files the cloud storage host may charge less for data types that include multiple small files rather than data types which may include large files. However, users may attempt to embed data types associated with a larger fee with data types associated with a smaller fee. In other words, users may embed document data for various data types in other data types to attempt to hide or obscure the document data being stored on the cloud storage server.

In various embodiments, the document data may be opened and processed with one or more data processing algorithms. Document data may then be evaluated for the presence of starting and ending headers. Upon identification of the ending header, the algorithm may evaluate the presence of additional data after the ending header. If a threshold amount of data is included after the ending header there is an indication that unauthorized data is included. Additionally, in embodiments, a data size of the document data may be compared against a reference data size formed of the same data type and other properties, such as resolution or file type. The document data size may be compared against the reference data size and if it is a threshold amount greater than the reference data size there is an indication that the document data size includes unauthorized data. In embodiments, a copy of the document data may be re-saved in its original format. The original copy of the document data may then be compared to the re-saved document data. If the original copy is larger than the re-saved copy by a threshold amount, there is an indication that the original copy contains extraneous data, which may be unauthorized data. Furthermore, where document data is an image file, a pixel histogram may be computed to illustrate a variance between adjacent pixels in the image file. High variances between the pixels may indicate that some portion of the image contains random data, which may be unauthorized data because typical photographs do not have high variance across pixel values. As such, a threshold amount of variance may be used to determine if the document data likely includes unauthorized data. Additionally, various embodiments may generate an image gradient to evaluate the image file. For example, the gradient may be evaluated in a horizontal and a vertical plane to show shadowing in the image file indicative of one or more objects. Images that contain non-random data (e.g., authorized data) will likely contain edges that exist in both gradient computations. However, the absence of edges in both directions indicates random data. Accordingly, a threshold may be established to determine when the document data contains the unauthorized data. Furthermore, in embodiments, processing errors may also be indicative of the presence of unauthorized data. For example, data processing algorithms may expect a certain file format, which may become invalid when unauthorized data is embedded within the document data. In this manner, systems and methods of the present disclosure may be utilized to evaluate document data for unauthorized data.

In accordance with various embodiments, approaches provide improvements in network resources. For example, storing large quantities of document data may be costly for a cloud server host that pays for storage capacity, bandwidth, and the like. As such, users circumventing pricing structures may be costly for the cloud server host. Additionally, methods to detect the presence of unauthorized data are compared against the cost to use the methods. For instance, methods that utilize large quantities of processing power may be uneconomical and therefore would not provide any overall cost savings to the cloud server host. Accordingly, in accordance with various embodiments, approaches described herein provide a cost-efficient method for evaluating document data for unauthorized data. For example, one or more evaluations may be conducted based on a confidence factor indicating the likelihood of the presence of random data. For example, if a confidence factor of a first test is insufficient, a second test may be utilized. However, if the confidence factor is sufficient, the document data may be flagged without subsequent testing, thereby reducing the processing power used to evaluate the data. Further, embodiments of the present disclosure enable the cloud server host to receive the full value of their services from the user by receiving payments to store the data according to one or more cost structures. Additionally, storage capacity may be preserved because large files containing unauthorized data may be removed from the cloud host server and transitioned to a different storage site or under a different cost structure that yields higher payments for the cloud server host. Moreover, embodiments of the present disclosure may reduce bandwidth usage, thereby improving the efficiency of the storage and retrieval process, because large, unauthorized data will be removed from the system.

FIG. 1 is a perspective view of an embodiment of an authorized user 100 interacting with a client device 102. In this example, the authorized user 100 has logged into a cloud storage service 104 via the client device 102 to store one or more document files 106 (e.g., data files). This authorized user 100 may pay a nominal fee to the cloud storage service 104 to receive permission to store the document files 106 on a cloud storage server. In some embodiments, the documents file 106 may include word processing documents, spreadsheets, photos, videos, executable files, or any other reasonable electronic file that may be stored on the client device 102. The user 100 selects the document file 106 for transmission to the cloud storage server via a network accessible via wired or wireless communication devices, such as Wi-Fi, Bluetooth™, high-speed wireless communication (e.g., 4G, 3G, etc.), or the like. In the illustrated embodiment, the document file 106 for transmission to the cloud storage service 104 is a digital photograph. Upon selection and transmission, the digital photograph may be moved to the cloud storage server and be accessible to the user via one or more applications stored on the client device 102.

The cloud storage server receives the document file 106 and begins processing based on a data type associated with the document file 106. For example, the data type may be the format of the document file 106. Images may have formats such as JPEGs, TIFs, PNGs, and the like while videos may have formats such as MOV, MP4, WMV, and the like. Accordingly, the cloud storage server may identify the data type of the document file 106 for processing via one or more data processing algorithms. In the illustrated embodiment where the document file 106 is a digital photograph, the data processing algorithm may read the data type, extract metadata, and generate a thumbnail of the image for easier viewing by the user 100. Additionally, in embodiments, recognizing the data type may enable the cloud storage service 104 to implement a charge or track storage by the user 100. For instance, the cloud storage service 104 may have a cost structure associated with storing the document file 106 on the cloud storage server. Different data types may be associated with different costs, for example, per unit of storage. Because users 100 may take large numbers of photographs, and photographs are small to moderately sized data files, the cost structure of the cloud storage server may charge less for the storage of data types associated with digital photographs. However, other data types, such as ISO files or video files are typically very large, and therefore costs associated with storing these data files may be greater. Accordingly, the data processing algorithm enables the cloud storage service 104 to quickly identify and allocate the document file 106 to the proper cost structure.

Figure 2:
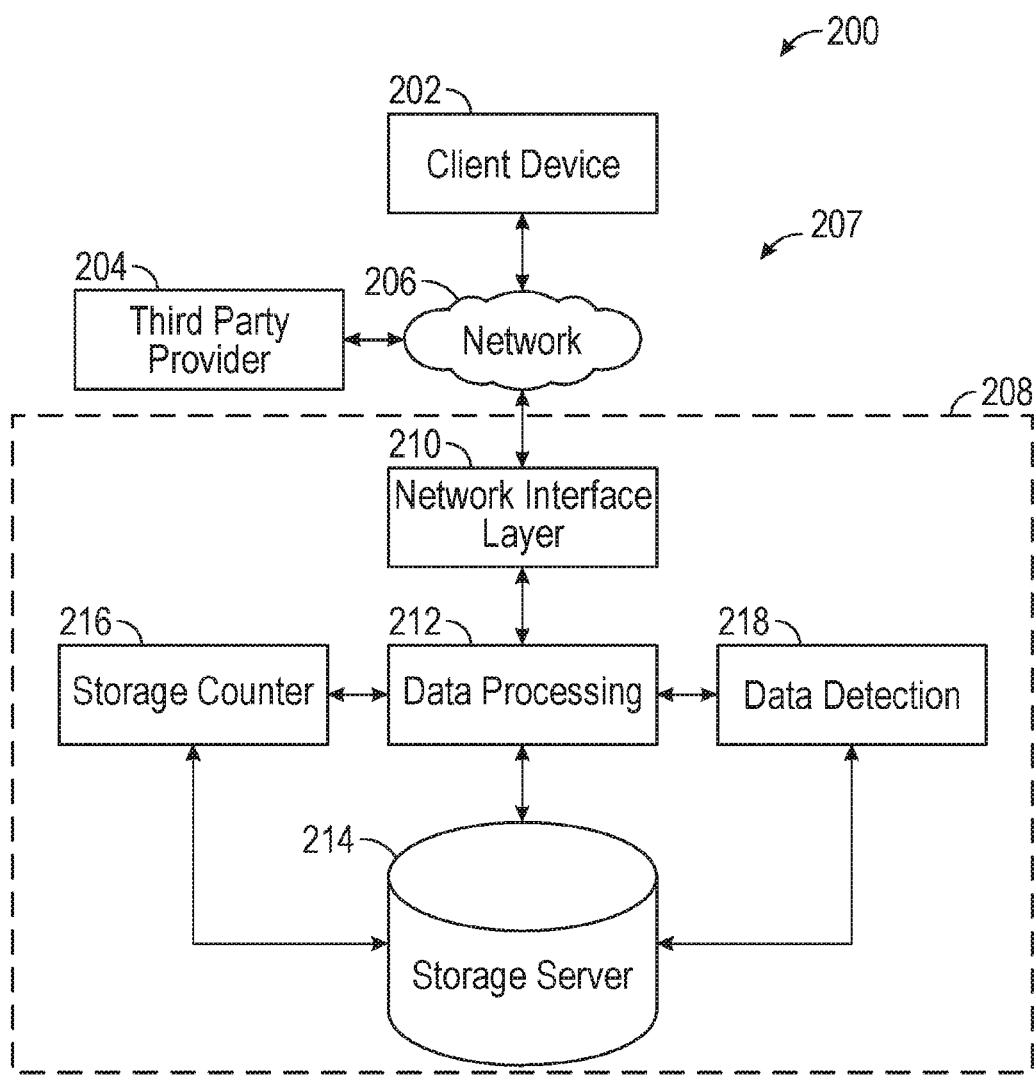
FIG. 2 illustrates an example system in which aspects of the various embodiments can be implemented, in accordance with various embodiments.

FIG. 2 illustrates an example system 200 in which aspects of the various embodiments can be implemented. A shown in FIG. 2, a cloud storage system 207 associated with an entity 208 such as a cloud storage environment or other such provider can include one or more data processing modules 212, a storage counter 216, and a data detection module 218. Additional or alternative modules and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

In this example, content such as the document files 106 is stored on a client device 202. Although a portable computing device may be described in various examples, it should be understood that any appropriate device can be used to present content in accordance with the various embodiments, as may include notebook computers, personal data assistants, e-book readers, cellular phones, video gaming consoles or controllers, smart televisions, set top boxes, a wearable computer (e.g., a smart watch, contacts, or glasses), an augmented or virtual reality device, and portable media players, among others. The client device 202 includes an application hosted by a third party application provider 204 to enable at least cloud storage services. The third party application may be graphically represented on the client device 202 such that the user may select and view document files 106 for transmission over at least one network 206, such as the Internet, an intranet, a local area network, a cellular network, or another appropriate wired and/or wireless network.

The illustrated network 206 communicates with a cloud storage environment 208 that receives data, such as data representative of the document file 106, from the client device 202. The data may be received via a network interface layer 210, which can include one or more interfaces such as application programming interfaces (APIs) for receiving requests, as well as various other network components such as routers, load balancers, and the like. The data can be processed using one or more data processing modules 212 that may include data processing algorithms to evaluate, load, render, or otherwise interact with the data forming the document files 106. The data processing module 212, upon evaluation of the document data, may direct the data to one or more storage servers 214. It should be appreciated that the storage servers 214 may include a number of racks of host machines or servers. Additionally, the storage servers 214 may include one or more storage locations, such as hard drives (e.g., solid stage, magnetic, hybrid, etc.) for receiving and storing the document file 106.

The cloud storage environment 208 of FIG. 2 also includes a storage counter 216. The storage counter 216 receives information from the data processing module 212 to track the storage being used by the user 100. For example, the user 100 may have a subscription to store a limited quantity of data on the storage servers 214. The storage counter 216 may keep a running total of all of the data associated with the user 100 currently stored on the storage servers 214. Moreover, in embodiments where the user 100 has a subscription to store different quantities of different data types, the storage counter 216 keeps a running total of the data associated with each different data type. This information may be transmitted to the user 100 to enable the user 100 to track their storage capacity and provide the opportunity to purchase additional storage.

Cloud storage environment 208 also includes a data detection module 218. The data detection module 218 receives information from the data processing module 212 for further evaluation regarding the content of the transmitted document files 106. In certain embodiments, the user 100 may try to circumvent the established cost structure by embedding data from one data type into another. This may be referred to as unauthorized data because it may enable the user 100 to store document files 106 under a different, lower cost structure. For example, the user 100 may embed a large ISO file into a photograph stored as a JPEG. The document file 106 would be transmitted to the cloud storage environment 208 and evaluated with the data processing module 212, which would determine the document file 106 is a JPEG and corresponds to the cost structure associated with photographs, which may be less costly than other cost structures. Accordingly, the user 100 may store a large file under a preferred cost structure at the expense of the cloud server host. As will be described in detail herein, the data detection module 218 may perform one or more methods to evaluate the bytes of data forming the document file 106 to detect the presence of unauthorized data. Thereafter, the document file 106 containing the unauthorized data may be flagged, removed, reprocessed, or otherwise identified.

The cloud storage system 207 may be implemented on one or more physical server computing devices that provide computing services and resources to users. In some embodiments, the cloud storage system (or individual components thereof, such as the processing module 212, the storage counter 216, and the data detection module 218 may be implemented on one or more host devices, such as blade servers, midrange computing devices, mainframe computers, desktop computers, or any other computing device configured to provide computing services and resources. For example, a single host device may execute one or more content servers, one or more group generators, various data stores, some combination thereof, etc. The content management system may include any number of such hosts.

In some embodiments, the features and services provided by the cloud storage system 207 may be implemented as web services consumable via a communication network. In further embodiments, the cloud storage system (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

Figure 3A:
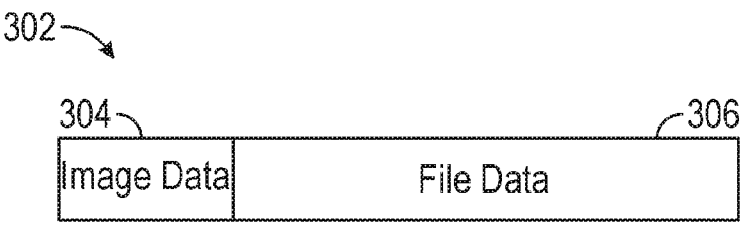
FIGS. 3A-3B illustrate example scenarios in which various embodiments of the present disclosure can be utilized.

Users 100 may utilize a variety of methods to embed unauthorized data into other document files 106. FIG. 3A illustrates an example of document data 302 formed of authorized data 304 and unauthorized data 306. In this example, the illustrated unauthorized data 306 is concatenated to the authorized data 304. As a result, the document data 302 may load and be viewable as if there is no additional data. Accordingly, when the data processing module 212 evaluates the data it may perform an analysis and determine the document file 106 is a certain type of data type, even though additional data is appended to the end, because the document file 106 may be executable and readable.

Figure 3B:
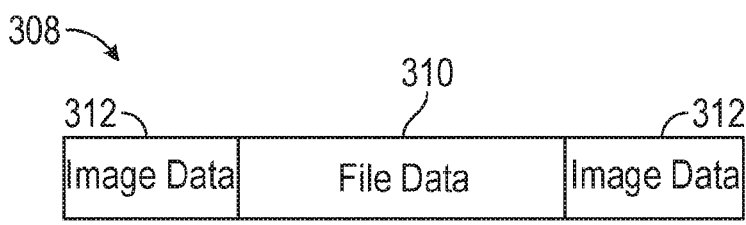

FIG. 3B illustrates an example of document data including both authorized data 304 and unauthorized data 306. As shown, the unauthorized data 306 is distributed throughout the authorized data 304. While the illustrated embodiment may include the unauthorized data 306 embedded within the center of the authorized data 304, it should be appreciated that the unauthorized data 306 may be embedded at any location within the authorized data 304 and/or throughout the authorized data 304.

In various embodiments, image files may be the document data evaluated for the presence of unauthorized data. This unauthorized data could be embedded ISO files, video files, music files, or any other type of data. The unauthorized data may be concatenated at the end of the bytes of data forming the image file, for example, after the end header in the image file. As a result, the image file will load normally when processed by a typical viewing application, but will have a significantly increased file size. Furthermore, in certain situations, the unauthorized data may be embedded between the start/end headers and/or randomly distributed throughout the data forming the image file. These files may not load properly as image files, but that may be immaterial to users merely using the files to a vessel to storage different information. Additionally, unauthorized data may be embedded into both compressed and uncompressed files. Accordingly, cloud hosting services that offer reduced nominal fees to host image files may be susceptible to users adding unauthorized data to image files to avoid paying higher hosting fees. This practice not only reduces revenue for cloud storage hosts, but also increases storage costs, uses additional bandwidth to transmit files, and wastes resources processing image files that contain significantly more data than necessary.

Certain data types include markers or indicators corresponding to start and end points of the data comprising these data types. For example, image files may include start and end markers indicative of the beginning of data incorporating the image file and the end of such data. In embodiments, the data processing algorithms may evaluate the document data, such as the image files, for the start and end markers. Data included after the end marker may be indicative of additional data stored within the image file that is not associated with the image file, such as extra data corresponding to a different data type. Detection of extra data may be used to flag or otherwise identify the image file as potentially including unauthorized information. For example, the amount of data after the end marker may be compared to a threshold amount of data typically found after end markers, such as metadata. If the amount of data after the end marker exceeds the threshold, the image file may include unauthorized data and be flagged. In certain embodiments, a confidence factor may be evaluated indicative of the likelihood of the image file including unauthorized data. The confidence factor may be a percentage or comparison with typical data quantities stored after end markers. For example, if the data after the end marker is 50 percent larger than the threshold, the confidence factor may be high that the image file includes unauthorized data. Additionally, in embodiments, certain data types may include one or more indicators corresponding to a size of the document data. Accordingly, reading through the data file up to the amount provided by the indicator may further be utilized to determine if the file contains unauthorized data.

Figure 4:
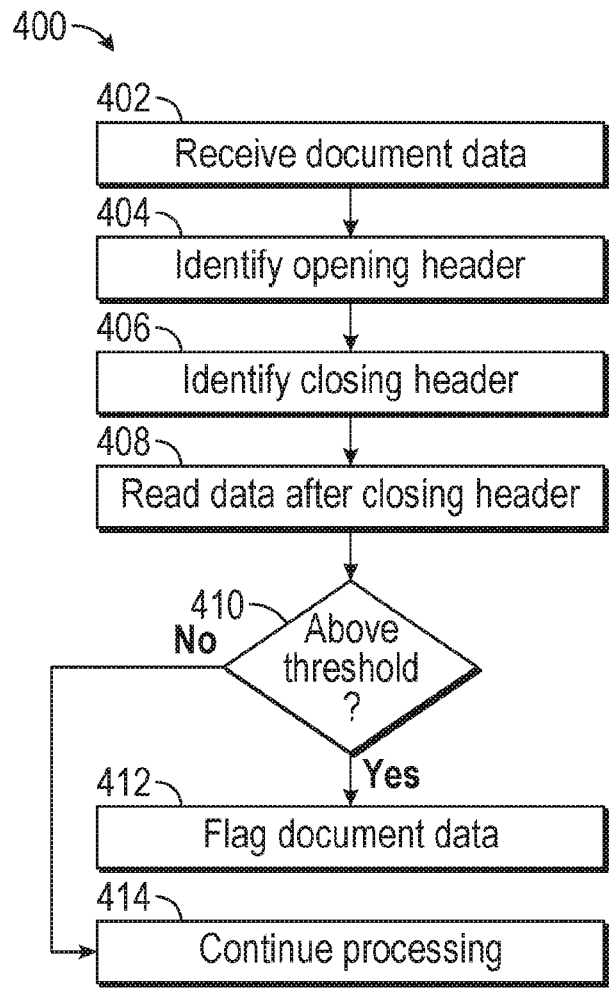
FIG. 4 illustrates an example process for document data evaluation, in accordance with various embodiments.

FIG. 4 illustrates an example process 400 for evaluating document data within a data file, in accordance with various embodiments. It should be understood that there can be additional, fewer, or alternative steps performed in similar or alternative orders, or in parallel, within the scope of the various embodiments unless otherwise stated. In this example, a cloud storage environment receives document data 402 from a client device. The document data includes at least a set of data associated with a data type. As described above, the data type may identify which type of file format the document data is, such as a video, picture, executable file, or the like. Moreover, in embodiments, the data type may further be associated with a storage format indicative of a file format, such as a JPEG or TIFF for photographs. Thereafter, an opening header is identified 404. The opening header may indicate where the bytes forming the document data begin. Next, a closing header is identified 406. The closing header provides an indication that the data forming the exit file has ended. As such, data concatenated to the end of the document data may be unauthorized data. The process then determines if data exists after the closing header 408. For example, when evaluating the respective opening and closing headers there may be an indication that a certain quantity of data should be appear between the headers. Accordingly, once the process reads that quantity of data the quantity of data appearing after the closing headers will likely be minimal if the data file includes only data associated with the data file. To this end, the process compares the data after the closing header to a threshold 410. If the data after the closing header is larger than the threshold 412, the document data may be flagged as potentially including additional unauthorized data. If the data after the closing header is less than the threshold 414, the document may be processed using additional methods and/or stored on the cloud storage server.

It should be appreciated that the process 400 described above may be utilized to detect unauthorized data with minimal processing. For instance, the document data may not even be loaded or rendered, rather, minimal processing of the expected size of the document data as indicated in the opening and/or ending header may be used to reduce the processing time and resources associated with evaluating the document data for unauthorized data. For example, in embodiments where the document data is an image file, the image file may be uploaded to the cloud storage environment 208 via the client device 202. Thereafter, the data detection module 218 may scan the opening and closing headers of the file. By way of example only, if the image file is a 4 MB JPEG and the data detection module 218 receives an indication in the opening header that the data comprising the image file is approximately 4 MB, then the data detection module 218 may read approximately 4 MB of additional data. Accordingly, if a second image type, say a 4 GB ISO file, is concatenated to the image file, the data detection module 218 will read approximately 4 MB of data, rather than the full approximately 4 GB of data to quickly determine unauthorized data is present. In this manner, processing speeds may be reduced and the latency between receiving the data file and determining whether the data file has unauthorized data may also be reduced.

The illustrated process 400 described above includes a comparison with a threshold value. This threshold may be a percentage of the expected size of the data file, as determined from the opening and/or closing header. For example, the threshold may be calculated as a percentage of additional data after the closing header over the total expected file size. Returning to the example above, if the expected file size is 4 MB and the data after the closing header is 4 GB, the resulting calculation would be 1,000 times larger than expected. However, if the data after the closing header were only 1 kb, the additional data would only form a fraction of a percentage of the total file size. This threshold may also be utilized to develop a confidence factor. For example, the confidence factor may be lower when the extra data is small compared to the expected file size and higher when the extra data is large compared to the expected file size. Additionally, in embodiments the confidence factor may be assigned a numeric value.

In various embodiments, hosts may offer different rates for storage of image files or provide unlimited storage for image files, while charging fees for different data types. When the image file is transmitted to the storage server, various document processing algorithms can be used to prepare the image file for storage. These processing algorithms may extract metadata from the image file or prepare a thumbnail. Additionally, the document processing algorithms can evaluate a data size associated with the image file. Because image files are typically created by personal devices, such as cameras, smartphones, or wearable devices, image files have a range of expected data sizes. For example, compressed image files such as JPEGs are expected to be smaller than uncompressed files such as TIFFs, but both types of image files will likely be smaller than a high definition video file. Accordingly, during processing, the document processing algorithms can evaluate the data size of the image file against a threshold or reference data size corresponding to the expected data sizes associated with the corresponding data type. If an image file, for example, is larger than the reference data size, then the image file may be flagged. Flagging the image file may identify the image file for further evaluation at a later time and/or trigger removal of the image file from the cloud storage server.

In various embodiments, a data size of a set of data comprising document data, such as an image file, may be evaluated. Upon receiving an upload from a user, the cloud host server may compare the data size of the image file against a reference data size. For example, the data processing algorithm may evaluate properties (e.g., resolution, file type, etc.) of the image file to determine a reference data size with which to make the comparison. It should be appreciated that low resolution, compressed image files will have smaller data sizes than high resolution, uncompressed image files. For example, high quality, high resolution images files will likely be around 100 MB. If the image file uploaded to the cloud host is significantly larger, for example several gigabytes, there is an indication that the image file includes unauthorized data. Furthermore, if a low quality, low resolution, compressed image file has a data size of several gigabytes, there is an indication that the image file includes unauthorized data because a reference data size for the low quality, low resolution, compressed image file may be several megabytes. In various embodiments, the difference between the data size of the image file and the reference data size may be compared to a threshold amount. When the difference is greater than the threshold, the image file may be flagged as potentially including authorized data. The threshold may be a 20 percent difference, a 30 percent difference, a 40 percent difference, a 50 percent difference, or any other reasonable measure of the difference between the data size of the image file and the reference data size.

Figure 5:
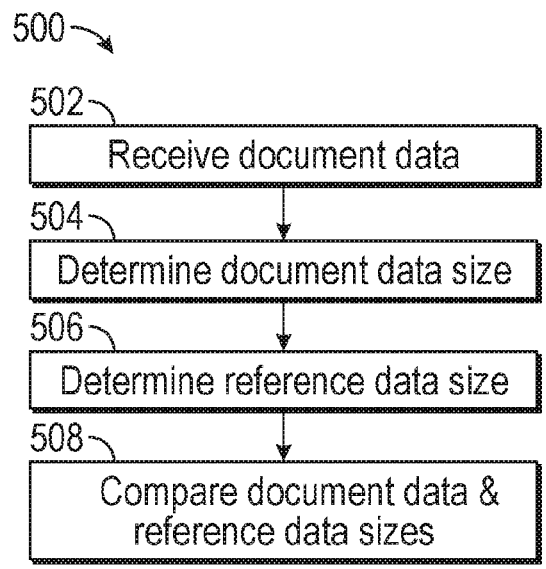
FIG. 5 illustrates an example process for document data evaluation, in accordance with various embodiments.

The process 400 described in FIG. 4 may be utilized when unauthorized data is concatenated to authorized data. However, when the unauthorized data is embedded between the opening and closing headers, additional processing may be utilized. FIG. 5 illustrates a process 500 for evaluating document data within a data file, in accordance with various embodiments. In this example, a cloud storage environment receives document data 502 from a client device. The document data includes at least a set of data associated with a data type, as described above. A data size of the document data is determined 504, for example through processing via the data processing modules 212 or the storage counter 216. Thereafter, a reference data size is determined 506. For instance, upon receipt of the document data the data type may be determined, for example a photograph. The document data may also include additional information, such as the file format, resolution, and the like. Accordingly, the reference data may be determined by evaluating a data type, stored in the same file format, with the same resolution, etc. Additionally, in some embodiments, the reference data size may be determined due to the nature of the document data. For example, if the data type is a photograph on the client device, it may be known that typical cameras on client devices tend to produce photographs having a certain resolution and certain quality such that the files may rarely exceed a certain amount, such as 100 MB. Accordingly, the reference data size may be set to a known high-end of a range of potential outputs from the client device. In embodiments, the reference data sizes may be stored in a data store or the like that is accessible by the cloud storage environment 208 or part of the cloud storage environment 208. The process may then compare the document data size with the reference data size 508. If the document data size is larger than the reference data size, the document data may be flagged as potentially including unauthorized data. If the document data size is less than or equal to the reference data size, the document data may be processed with further techniques and/or stored on the cloud storage server.

In certain embodiments, the document data size relative to the reference data size may be compared to a threshold. For example, if the document data size is more than 50 percent larger than the reference data size, the document data may be flagged as potentially including unauthorized data. Furthermore, confidence factors may also be established. For example, if the document data size is between 0 and 25 percent larger than the reference data size, the confidence may be low. If the document data size is between 25 and 50 percent larger than the reference data size, the confidence may be medium. If the document data size is between 50 and 75 percent larger than the reference data size, the confidence may be high. And if the document data size is more than 75 percent larger than the reference data size, the confidence may be very high. It should be appreciated that the ranges described herein are for example purposes only and any reasonable ranges may be defined to establish the confidence factors. Moreover, the confidence factors may be assigned numerical values, as opposed to "low," "medium," "high," and "very high."

In various embodiments, a data size of a set of data comprising document data, such as an image file, may be evaluated. For example, when the image file is uploaded to the cloud host, the image file may be processed with the data processing algorithm and re-saved as a second image file having the same file properties (e.g., resolution, file type, etc.). Thereafter, a data size of the original image file is compared to a data size of the second image file. If the original image file is larger than the second image file by a threshold amount, there is an indication that the original image file includes unauthorized data. By resaving the original image file as the second image file using the same file properties, all extraneous data not necessary to produce the image stored in the image file is removed. Accordingly, original files having unauthorized data will be larger than the second image that represents only the data to produce the image. In various embodiments, a confidence factor may be used to determine the likelihood that the original image file contains unauthorized data. For example, when the original image file and the second image file each have data sizes within a range, such as approximately 5-10 percent, of one another, the confidence factor may be low, indicating the original image file likely does not contain unauthorized data or contains very little unauthorized data that does not trigger further processing. However, if the original image file is larger than the second image file by approximately 50-100 percent, the confidence factor may be higher to indicate that the original image file likely does contain unauthorized data. Moreover, if the original image file is significantly larger than the second image file, such as approximately more than 500 percent larger, the confidence factor is very high that the original image file likely contains unauthorized data.

Figure 6:
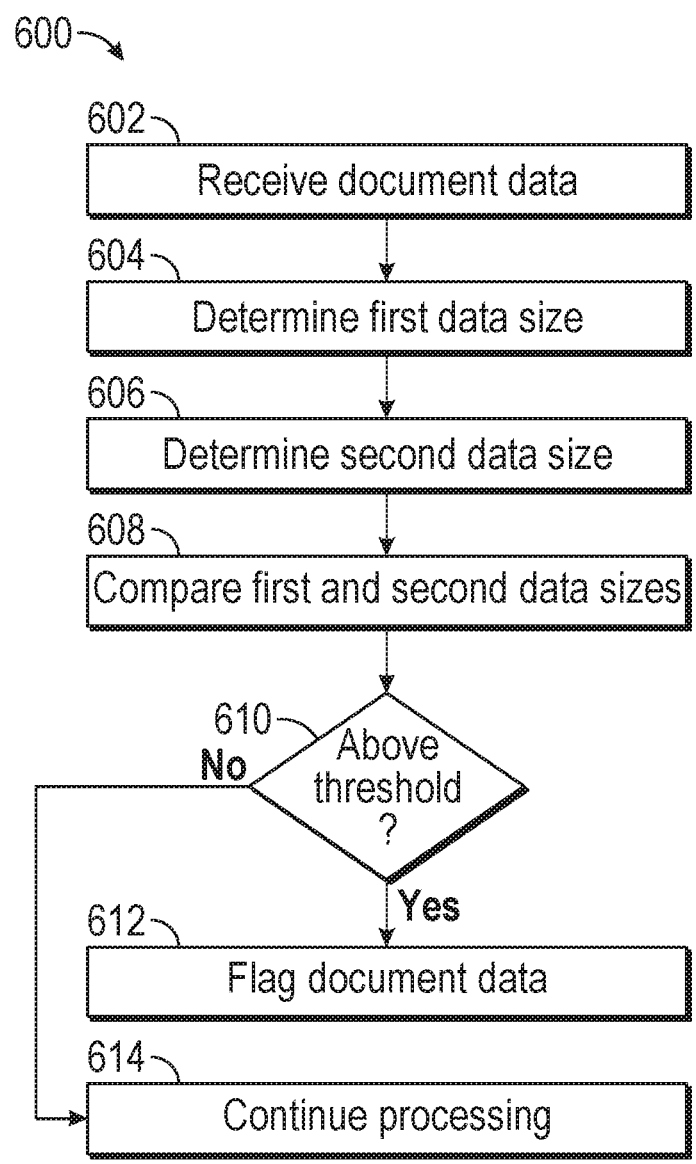
FIG. 6 illustrates an example process for document data evaluation, in accordance with various embodiments.

FIG. 6 illustrates a process 600 for evaluating document data within a data file, in accordance with various embodiments. In this example, a cloud storage environment receives document data 602 from a client device. The document data includes at least a set of data associated with a data type, as described above. In certain embodiments, the data type is an image file. However, it should be appreciated that other types of document data may also be utilized. A first data size of the document data is determined 604, for example through processing via the data processing module 212. Next, a second data size of the document data is determined 606. In embodiments, the second data size is determined by re-saving or copying the document data as a new file having the same properties as the original data file. For example, if the original data file is a JPEG having a certain resolution, the new data file is also saved as a JPEG having that certain resolution. This process removes extraneous data from the original data file because any later-added data unnecessary to process the image will be stripped away when the image is re-saved or copied. Thereafter, the first data size and the second data size are compared 608. A threshold difference between the first data size and the second data size 610 is then determined. If the first data size is larger than the second data size by an amount greater than the threshold 612, it is likely that the document data contains unauthorized data. As a result, the document data may be flagged. If the difference between the first data size and the second data size is less than the threshold 614, it is likely that the document data does not contain unauthorized data.

In certain embodiments, the threshold comparison is based on a percentage difference between the first data size and the second data size. For example, if the first data size is more than 50 percent larger than the second data size, the document data may be flagged as potentially including unauthorized data. Furthermore, confidence factors may also be established. For example, if the first data size is between 0 and 25 percent larger than the second data size, the confidence may be low. If the first data size is between 25 and 50 percent larger than the second data size, the confidence may be medium. If the first data size is between 50 and 75 percent larger than the second data size, the confidence may be high. And if the first data size is more than 75 percent larger than the second data size, the confidence may be very high. It should be appreciated that the ranges described herein are for example purposes only and any reasonable ranges may be defined to establish the confidence factors. Moreover, the confidence factors may be assigned numerical values, as opposed to "low," "medium," "high," and "very high."

Figures 7A, 7B:
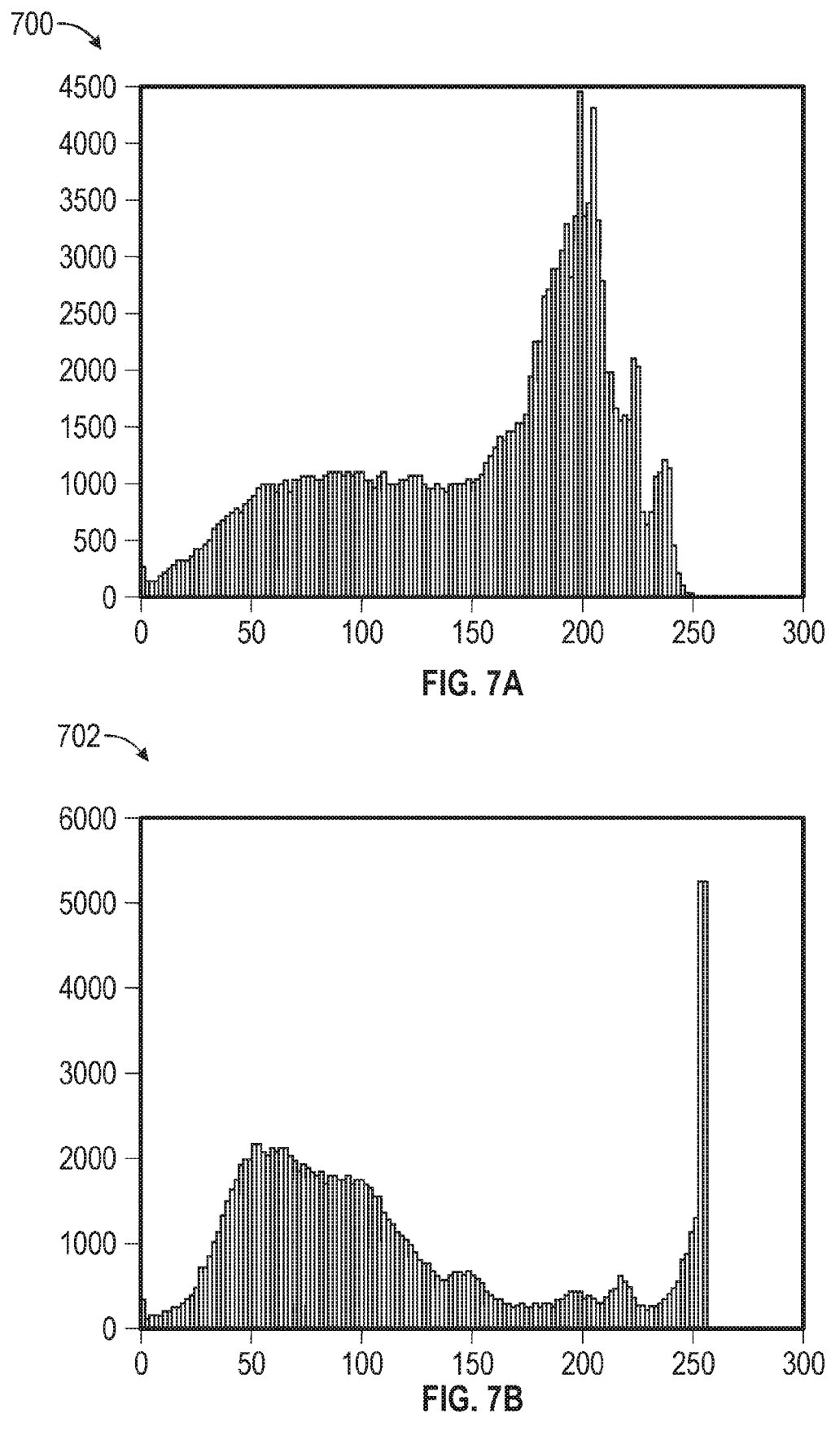
Figure 7C:
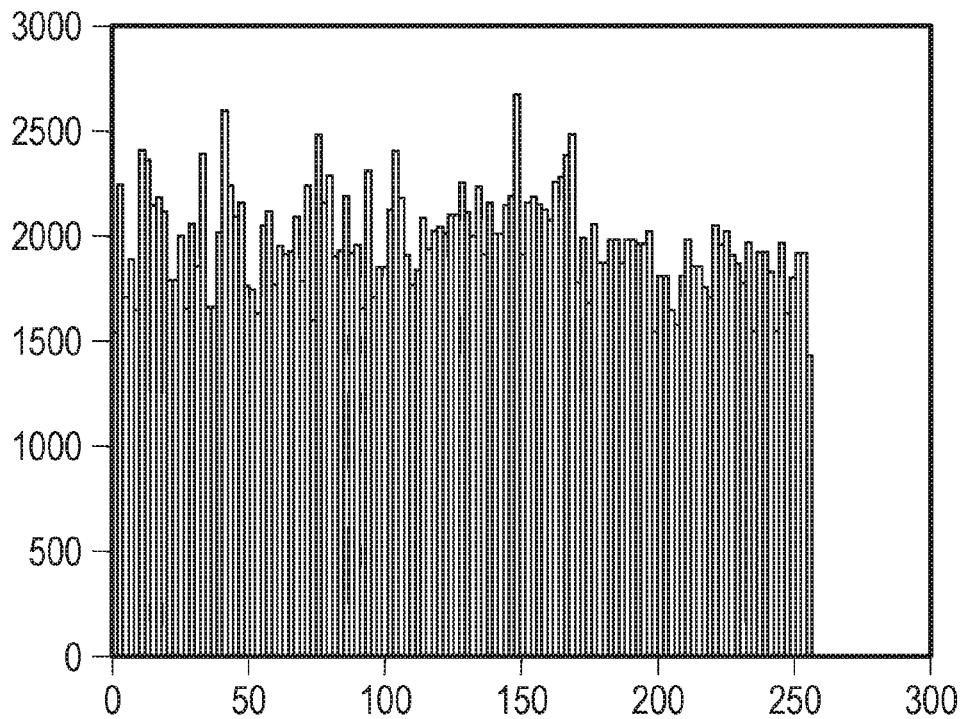
Figure 7D:
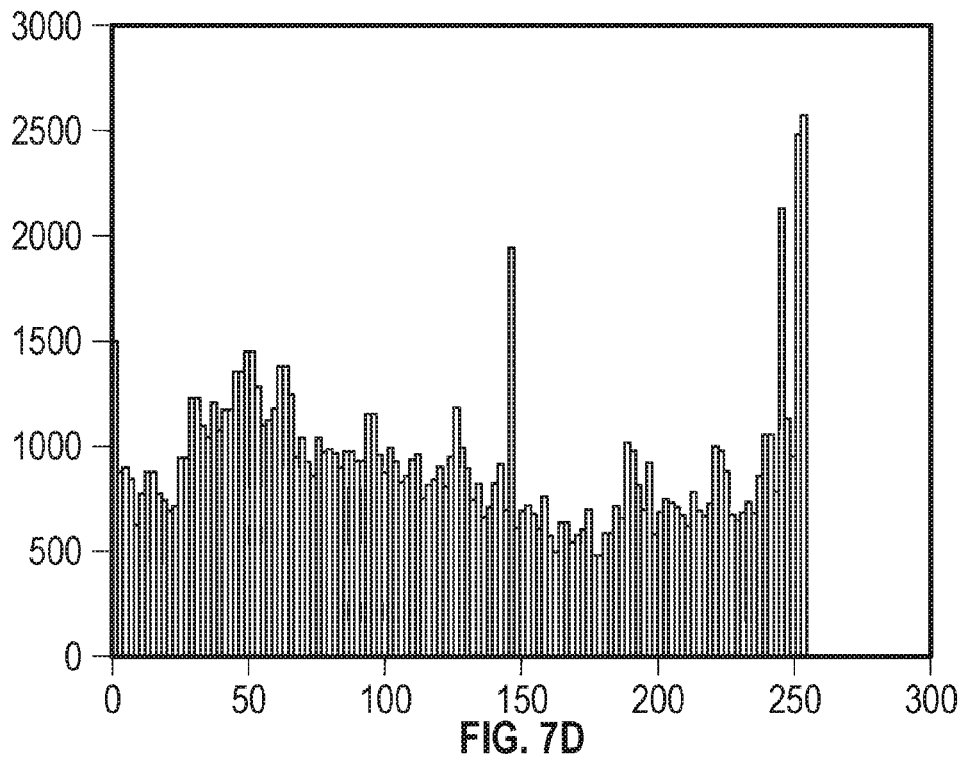

In certain embodiments, one or more of the above-described processes 400, 500, 600 may be utilized as a first-pass evaluation for document data loaded to the cloud storage server. That is, the processes 400, 500, 600 may use minimal processing resources and/or time to evaluate the document data. Furthermore, these processes 400, 500, 600 may be robust and quickly implemented to identify potentially unauthorized data embedded within authorized data forming document data. However, in certain embodiments, additional processing may be utilized to establish a greater confidence that document data includes unauthorized data. For example, when evaluating image files, properties of the image itself, such as the pixels and gradients forming the image, may be used to determine whether unauthorized data is embedded in the image file. FIGS. 7A and 7B illustrate examples of histograms 700, 702 representative of pixel variance in an image. The y-axis represents a frequency (e.g., a number of pixels having a certain tone or brightness level) while the x-axis represents an intensity (e.g., a brightness of a pixel). In other words, the histogram provides a graphical representation of the number of pixels that have a certain color or brightness value in a range. As shown, the histograms 700, 702 are generally smooth and curved, showing little abrupt variance between adjacent pixels. These histograms 700, 702 are representative of histograms for images that do not contain any embedded or random data, such as unauthorized data. In contrast, FIGS. 7C and 7D illustrate examples of histograms 704, 706 representative of images having a high pixel variance, and therefore likely include random data, such as unauthorized data. As shown, FIG. 7C does not have the smooth and curved look at FIG. 7A, but rather includes random differences in pixel frequency and intensity. Similarly, FIG. 7D also includes skewed pixel variance. Accordingly, images having histograms similar to FIGS. 7C and 7D have a higher likelihood of including embedded random data than images having histograms similar to FIGS. 7A and 7B.

In various embodiments, document data may be received by the cloud storage server and processed with one or more data processing algorithms. In certain embodiments, the document data is an image file. Image files are formed of data representing a color value for various pixels that, together, form the image file. These pixels may be plotted, for example as a histogram, to represent a distribution of pixel values across the image file. Histograms for most images have a slope or smooth transition between different pixel values. In contrast, image files with embedded data are substantially flat. A wheel function can be used to map out the histogram to look for the presence of random data or noised embedded within the image. The histogram may be evaluated by looking at differentials point by point along the image file, or to reduce computing resources for the evaluation every 10 or 100 points, to identify the presence of noise or random data, which may be unauthorized data. If a threshold amount of the image data includes random data, as determined by the differentials or shape of the histogram, then the image may be flagged.

Figure 8:
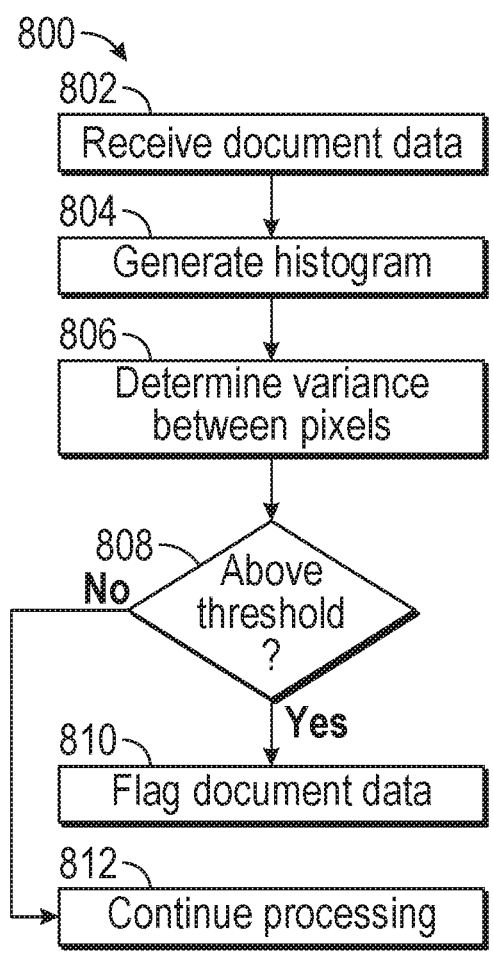
FIG. 8 illustrates an example process for document data evaluation, in accordance with various embodiments.

FIG. 8 illustrates a process 800 for evaluating document data within a data file, in accordance with various embodiments. In this example, a cloud storage environment receives document data 802 from a client device. The document data includes at least a set of data associated with a data type, as described above. In the illustrated embodiment, the data type is an image file, which may be stored in a variety of compressed and uncompressed formats. The process generates a histogram of pixel values 804, which may be representative of the image data and any additional data that may be embedded within the document data. For example, the histogram may plot an intensity against a frequency to provide a graphical representation of the tonal distribution in a digital image. Respective variances between pixel values are determined 806. As described above, the variance between adjacent pixels should be generally gradual to thereby form a curved and generally smooth flowing graphical representation. Accordingly, larger variances may be indicative of random data. Next, the variance is evaluated against a threshold 808. It should be appreciated that individual variances may be evaluated or an average variance across the histogram or a sum of variances across the image, among other possibilities. If the variance is above the threshold 810, the image is flagged as potentially including unauthorized data. If the variance is below the threshold 812, the image is not flagged and processing may continue. In this manner, pixel variance may be utilized to determine if embedded data is included in image files.

In certain embodiments, the threshold comparison is based on a percentage difference between pixel values. For example, a large difference (e.g., approximately 25 percent) may be indicative of random data embedded within the image file. Furthermore, it should be appreciated that each individual pixel may not be analyzed in order to reduce processing resources and time. Instead, a sample, such as every 10 or ever 100 pixels may be evaluated. Additionally, confidence factors may also be established, as described above. For instance, a variance between 0 and 10 percent may be low. A variance between 10 and 20 percent may be medium. A variance between 20 and 30 percent may be high. And a variance above 30 percent may be very high. It should be appreciated that the ranges described herein are for example purposes only and any reasonable ranges may be defined to establish the confidence factors. Moreover, the confidence factors may be assigned numerical values, as opposed to "low," "medium," "high," and "very high."

In various embodiments, after document data such as an image file is uploaded to a cloud storage sever one or more data processing algorithms may prepare the document data for storage. Image files include gradients representative of a directional change of intensity of color in an image. Accordingly, an image file with embedded random data, such as unauthorized data, may appear as white noise when evaluated as an image via a gradient computation algorithm. In embodiments, the gradient computation algorithm analyzes pixels of the image file in a horizontal plane (e.g., 0 degree) and a vertical plane (e.g., 90 degree). The result of each analysis is merged and thereafter forms an image that illustrates shadows indicative of an identifiable feature in the image when the image file does not contain random data. However, if the image file contains random data, which may be unauthorized data, the resulting analysis shows no shadows because there are no features to identify in the image file. Accordingly, gradient analysis may identify embedded data within the image files. In embodiments, a threshold amount corresponding to identifiable features in the image file may be evaluated to determine whether the image file contains unauthorized data. For example, if the image file had more than 30 percent of the image including noise or unidentifiable features then the image file may be flagged as potentially including unauthorized data. It should be appreciated that in other embodiments the threshold may be set at 10 percent, 20 percent, 40 percent, 50 percent, or any other reasonable value.

Figure 9:
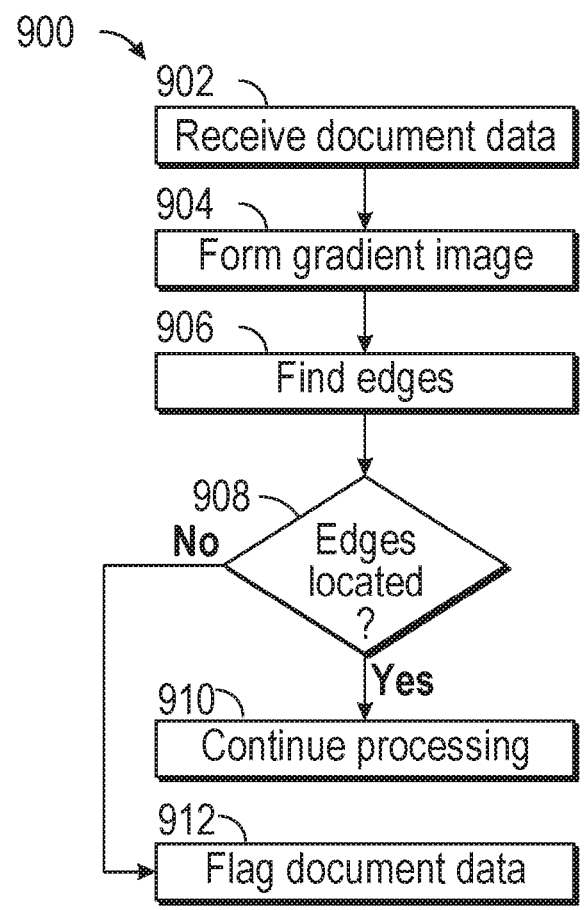
FIG. 9 illustrates an example process for document data evaluation, in accordance with various embodiments.

FIG. 9 illustrates a process 900 for evaluating document data within a data file, in accordance with various embodiments. In this example, a cloud storage environment receives document data 902 from a client device. Then, a gradient image is formed 904, for example using a gradient computation algorithm. In certain embodiments, the gradient image is a composition of a horizontal gradient and a vertical gradient. In other embodiments, the horizontal gradient and/or the vertical gradient may be analyzed individually. Thereafter, edges are determined in the gradient image 906. In embodiments, an edge detection algorithm may be utilized to find edges in the image. As described above, image files that include random data may not include edges. The process then evaluates a number of edges located 908. For example, a threshold value may be utilized to determine whether the gradient image includes an edge. If edges are detected in both directions 910, further processing or storage may continue. If edges are not detected in both directions 912, the document data may be flagged.

In certain embodiments, the edge detection may be assigned a certain value or confidence factor based on the number of edges detected. For example, detection of multiple edges and/or objects may be indicative of an image file without random data. Additionally, confidence factors may also be established, as described above. For example, a certain number of edges (e.g., 2) may indicate a low confidence. While additional edges (e.g., 10) may indicate a high confidence. It should be appreciated that the number of edges described herein are for example purposes only and any reasonable number may be defined to establish the confidence factors. Moreover, the confidence factors may be assigned numerical values, as opposed to "low" and "high."

In various embodiments, one or more methods may be used to analyze document data, such as image files, for the presence of unauthorized data. In certain embodiments, the methods may be used in parallel or series to provide further confidence that the image file includes unauthorized data before flagging and/or removing the image file from the cloud server. For example, the method of evaluating the data size of the image file against the reference data size may utilize little processing capacity but still provide a robust evaluation of the image file. In certain embodiments, ranges of differences identified by the comparison method may be utilized to categorize further processing steps. For example, if the confidence factor is very high, further processing may not be used. However, if the confidence factor is medium or low, subsequent processing may be used to further evaluate the image file for the presence of unauthorized data. For example after comparisons with a reference data size the method may then evaluate the image file for the presence of data after an end marker, as described above. The amount of data after the end marker may provide a confidence factor that, if high enough ends the process and flags the image file. However, further processing may still be utilized, such as the above-described method for comparing the data size of the original image file with the data size of a second image file, where the second image file is a resaved version of the original image file. Again, if a confidence factor is high enough that the image file contains unauthorized data the evaluation may stop. However, further processing may also be utilized such as evaluating the histograms and/or the gradients as described above. Accordingly, the method may begin by processing the image file with the method utilizing the lowest level of computational resources and apply additional evaluation if confidence factors are below a certain confidence threshold. In this manner, the data documents may be analyzed for the presence of unauthorized data.

Figure 10:
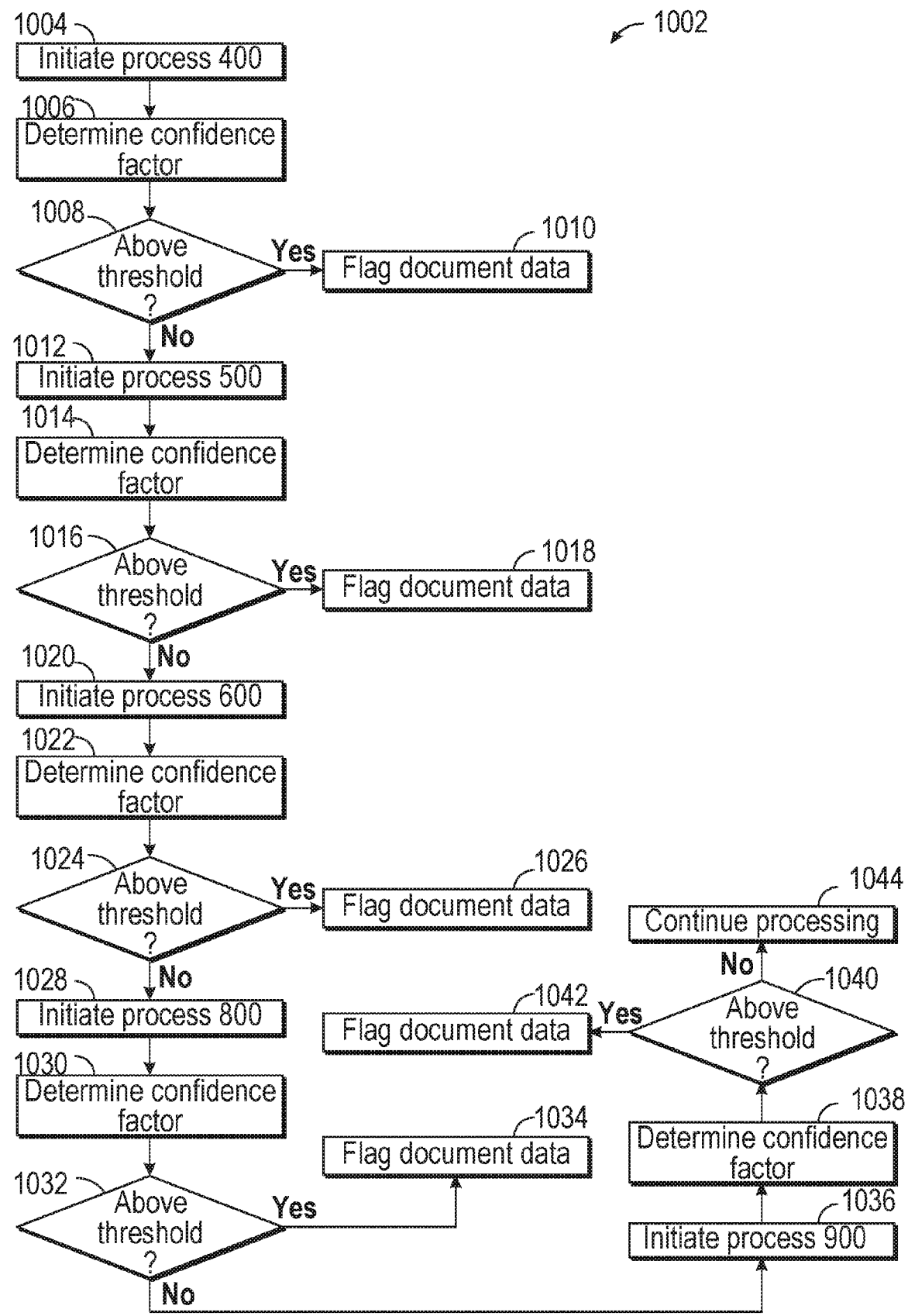
FIG. 10 illustrates an example process for document data evaluation, in accordance with various embodiments.

FIG. 10 illustrates a process 1002 for evaluating document data within a data file, in accordance with various embodiments. In this example, the process 400 initiates 1004 to evaluate the opening and closing headers. A confidence factor is determined 1006 based on the process 400. If the confidence factor is above a threshold 1008, the process 1000 ends 1010 and the document data is flagged. If the confidence factor is below the threshold 1008, the process 500 initiates 1012 to evaluate the document data against a reference data size. A confidence factor is determined 1014 based on the process 500. If the confidence is above a threshold 1016, the process 1000 ends 1018 and the document data is flagged. If the confidence factor is below the threshold 1016, the process 600 initiates 1020 to evaluate the original data size against a second data size. A confidence factor is determined 1022 based on the process 600. If the confidence factor is above a threshold 1024, the process 1000 ends 1026 and the document data is flagged. If the confidence factor is below the threshold 1024, the process 800 initiates 1028 to evaluate the histogram. A confidence factor is determined 1030 based on the process 800. If the confidence factor is above a threshold 1032, the process 1000 ends 1034 and the document data is flagged. If the confidence factor is below the threshold 1032, the process 900 initiates 1036 to evaluate the gradient image. A confidence factor is determined 1038 based on the process 900. If the confidence factor is above a threshold 1040, the process 1000 ends 1042 and the document data is flagged. If the confidence factor is below the threshold 1040, the process 1000 proceeds with further evaluation 1044. In this manner, different processes may be utilized to evaluate document data for the presence of unauthorized data. The different processes may have different levels of resource usage and thereby be segmented to enable one or more processes to initiate in a stand-alone configuration to evaluate the document data using the smallest number of processing resources. Moreover, the processes can be combined in any reasonable form to provide additional confidence or evaluation based on the results of previous evaluations.

Figure 11:
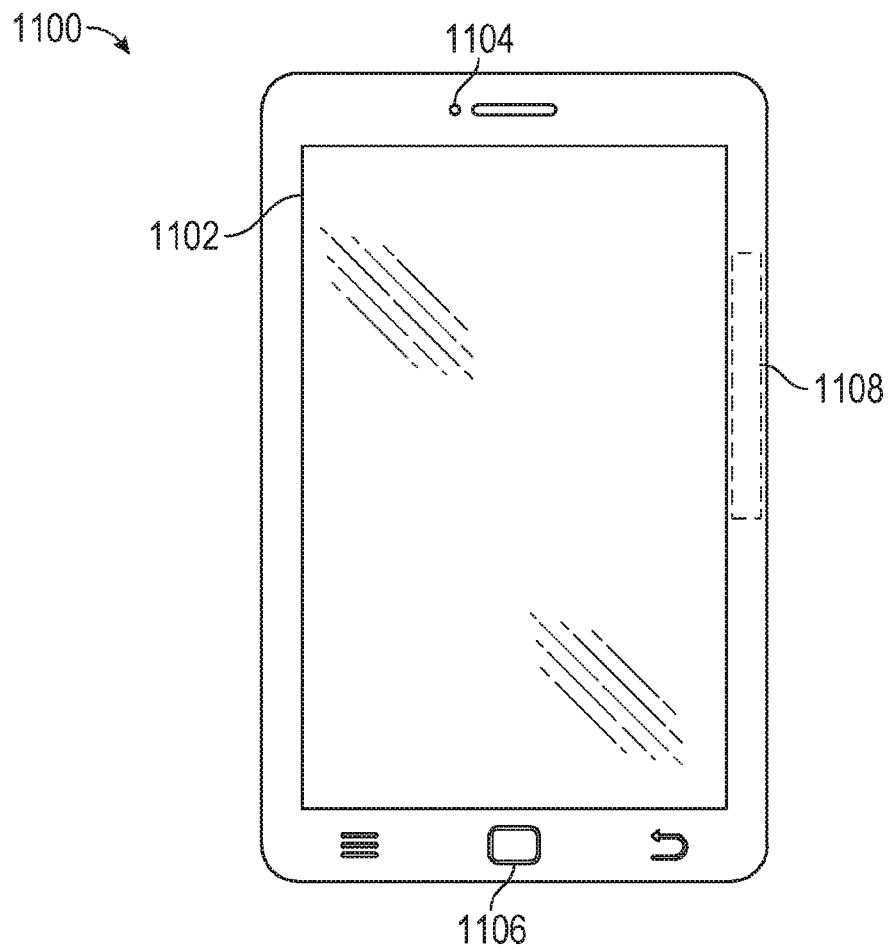
FIG. 11 illustrates an example device that can be used to implement aspects of the various embodiments.

FIG. 11 illustrates an example electronic user device 1100 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1100 has a display screen 1102 on the front side, which under normal operation will display information to a user facing the display screen (e.g., on the same side of the computing device as the display screen). The computing device in this example includes at least one camera 1104 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 1100 also includes at least one microphone 1106 or other audio capture device capable of capturing audio data, such as words or commands spoken by a user of the device. In this example, a microphone 1106 is placed on the same side of the device as the display screen 1102, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 1100 also includes at least one orientation sensor, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) 1108 or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 12:
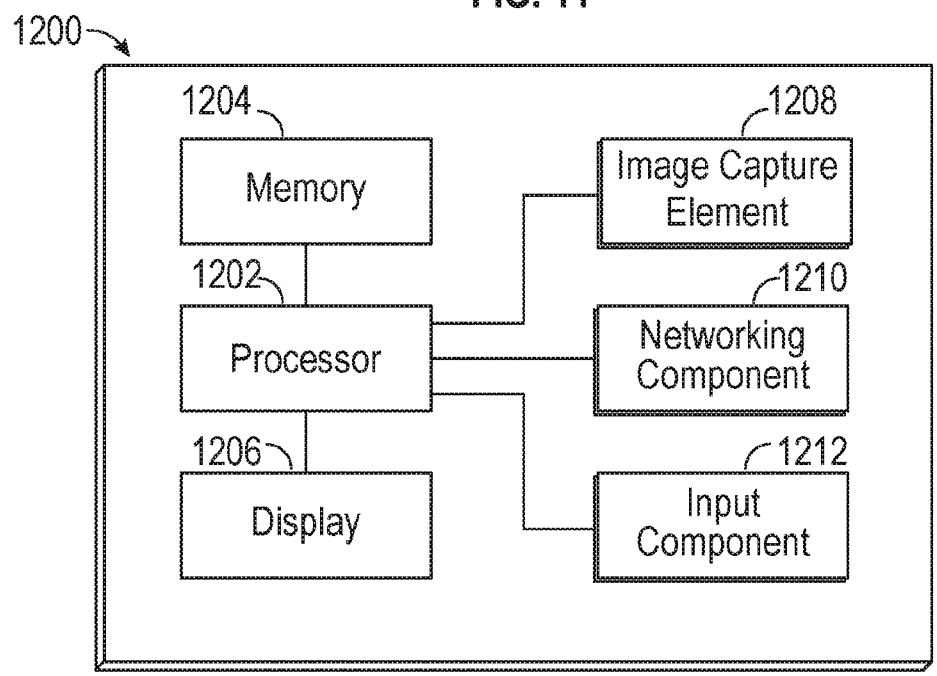
FIG. 12 illustrates example components of a client device, in accordance with various embodiments.

FIG. 12 illustrates a logical arrangement of a set of general components of an example computing device 1200 such as the device 1100 described with respect to FIG. 11. In this example, the device includes a processor 1202 for executing instructions that can be stored in a memory device or element 1204. As would be apparent to one of ordinary skill in the art, the device can include many types of memory, data storage, or non-transitory computer-readable storage media, such as a first data storage for program instructions for execution by the processor 1202, a separate storage for images or data, a removable memory for sharing information with other devices, etc. The device typically will include some type of display element 1206, such as a touch screen or liquid crystal display (LCD), although devices such as portable media players might convey information via other means, such as through audio speakers. As discussed, the device in many embodiments will include at least one image capture element 1208 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a unidirectional or an omnidirectional microphone as known for such devices.

In some embodiments, the computing device 1200 of FIG. 12 can include one or more communication or networking elements 1210, such as a Wi-Fi, Bluetooth, RF, wired, or wireless communication system. The device in many embodiments can communicate with a network, such as the Internet, and may be able to communicate with other such devices. In some embodiments the device can include at least one additional input component 1212 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1200 also can include at least one orientation or motion sensor or component. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1202, whereby the device can perform any of a number of actions described or suggested herein.

Figure 13:
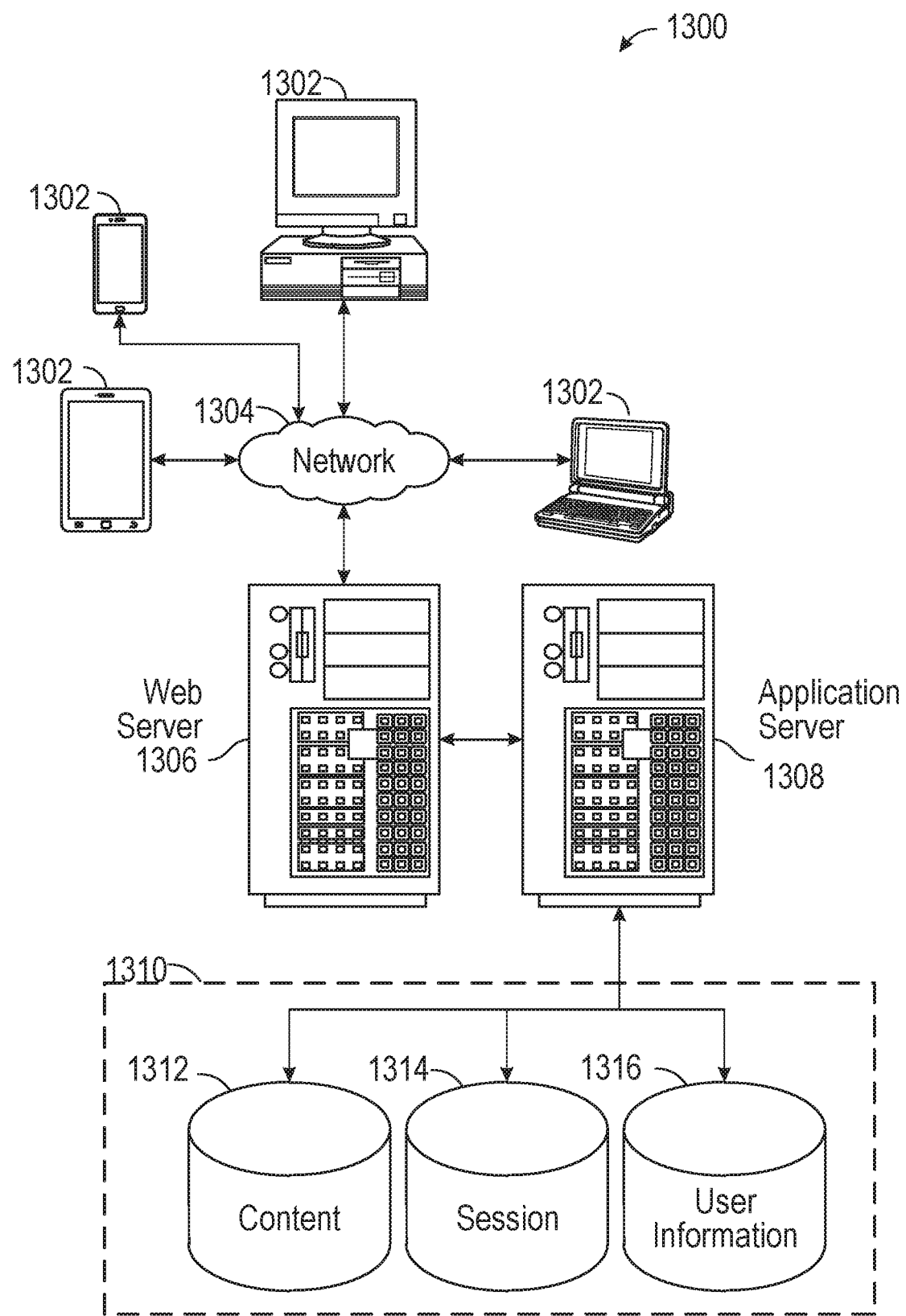
FIG. 13 illustrates an environment in which various embodiments can be implemented.

As discussed, different approaches can be implemented in various environments in accordance with the described embodiments. For example, FIG. 13 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks an alternative device serving a similar purpose could be used, as would be apparent to one of ordinary skill in the art.

The illustrative environment includes at least one application server 1408 and a data store 1310. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1302. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program services, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
 a computing device processor;
 a memory device including instructions that, when executed by the computing device processor, enable the computing system to:
  obtain an image file, the image file including image data and additional data;
  determine a first data size of the image data and a second data size of the image file, the first data size and the second data size corresponding to respective amounts of data occupying a storage device;
  determine a first confidence factor based at least in part on a comparison of the first data size and the second data size;
  analyze the image file to determine a histogram of pixel values representative of the image data and the additional data;
  determine respective variances between pixel values of the histogram of pixel values;
  determine a second confidence factor based at least in part on the respective variances;
  use a gradient computation algorithm on the image file to determine a set of gradients;
  determine a third confidence factor based at least in part on the set of gradients; and
  determine whether the additional data is unauthorized data based at least in part on the first confidence factor, the second confidence factor, and the third confidence factor.

2. The computing system of claim 1, wherein the instructions, when executed to determine the first confidence factor further enable the computing system to:
 determine that the second data size is greater than the first data size by at least a threshold data size amount.

3. The computing system of claim 1, wherein the instructions, when executed to determine the second confidence factor further enable the computing system to:
 analyze the image file to determine a histogram of pixel values representative of the image file;
 for each pixel location of a plurality of pixel locations of the image file, determine a differential in pixel values between a current pixel location and a subsequent pixel location of the plurality of pixel locations;
sum the differential in pixel values for the plurality of pixel locations to determine a total variance; and
compare the total variance to a threshold variance.

4. The computing system of claim 1, wherein the unauthorized data is embedded at any location within the authorized data or throughout the authorized data; and
the additional data is data stored within the image file, is not associated with the image file and corresponds to a different data type.

5. The computing system of claim 1, wherein the the first confidence factor, the second confidence factor, and the third confidence factor evaluate, based at least in part on a threshold, likelihood that the image file includes unauthorized data.

6. A computing system, comprising:
a computing device processor;
a memory device including instructions that, when executed by the computing device processor, enable the computing system to:
obtain document data, the document data including at least a set of data associated with a first data type, the first data type identifying a type of file format for the document data;
determine a data size of the set of data, the data size corresponding to respective amounts of data occupying a storage device;
determine a first confidence factor based at least in part on the data size;
determine one or more properties of the document data, the one or more properties being extracted from the set of data;
determine a second confidence factor based at least in part on the one or more properties of the document data;
analyze the first data type and the one or more properties to determine, from a data store, a reference data size of a plurality of reference data sizes;
determine a third confidence factor based at least in part on the reference data size; and
determine whether the document data includes additional data associated with a second data type based at least in part on the first confidence factor, the second confidence factor and the third confidence factor.

7. The computing system of claim 6, wherein the instructions, when executed further enable the computing system to:
identify an indicator in the document data, the indictor containing information corresponding to the data size of the document data; and
analyze the document data up to the data size provided by the indicator.

8. The computing system of claim 6, wherein the instructions, when executed further enable the computing system to:
determine the reference data size is greater than the data size by at least a threshold data size amount; and
flag the document data as including unauthorized additional data.

9. The computing system of claim 6, wherein the the one or more properties of the document data include pixels and gradients forming an image.

10. The computing system of claim 6, wherein the document data includes an end data marker, and wherein the instructions, when executed further enable the computing system to:
analyze the document data for additional data after the end data marker, the end data marker indicating an end to the set of data, the reference data size corresponding to a data size of the additional data.

11. The computing system of claim 6, wherein the instructions, when executed further enable the computing system to:
determine that the document data includes the additional data;
analyze the document data to determine a histogram of pixel values representative of the document data;
determine respective variances between a range of pixel values of the histogram of pixel values; and
determine whether the additional data is unauthorized data based at least in part on the respective variances.

12. The computing system of claim 11, wherein the the first confidence factor, the second confidence factor, and the third confidence factor evaluate, based at least in part on a threshold, likelihood that the document data includes the additional data; and
the additional data is data stored within the document data, and corresponds to a different data type.

13. The computing system of claim 6, wherein the instructions, when executed further enable the computing system to:
determine that the document data includes the additional data;
analyze the document data to determine a histogram of pixel values representative of the document data; and
compare the histogram to a plurality of model histograms to determine whether the additional data is unauthorized data.

14. The computing system of claim 6, wherein the instructions, when executed further enable the computing system to:
determine that the document data includes the additional data;
use a gradient computation algorithm on the document data to determine a set of gradients in a first plane and in a second plane; and
determine whether the additional data is unauthorized data based at least in part on the set of gradients.

15. The computing system of claim 14, wherein the instructions, when executed further enable the computing system to:
determine a number of edges in the first plane and the second plane; and
compare the number of edges to a threshold number of edges to determine whether the additional data is unauthorized data.

16. A method, comprising:
obtaining document data, the document data including at least image data;
determining a first data size of the image data and a second data size for the document data, the first data size and the second data size corresponding to respective amounts of data occupying a storage device;
determine a first confidence factor based at least in part on a comparison of the first data size and the second data size;
determining one or more properties of the document data, the one or more properties being extracted from the set of data and including pixels and gradients associated with at least one image data;
determine a second confidence factor based at least in part on the one or more properties of the document data;
analyze the one or more properties to determine, from a data store, a reference data size of a plurality of reference data sizes;
determine a third confidence factor based at least in part on the reference data size;
determining whether the document data includes additional data based at least in part on the first confidence factor, the second confidence factor and the third confidence factor, wherein the additional data is data stored within the document data, and corresponds to a different data type; and the first confidence factor, the second confidence factor, and the third confidence factor evaluate, based at least in part on a threshold, likelihood that the document data includes the additional data.

17. The method of claim 16, further including:
determining the second data size is greater than the first data size by at least a threshold data size amount; and
flagging the document data as including unauthorized additional data.

18. The method of claim 16, further including:
determining that the document data includes the additional data;
analyzing the document data to determine a histogram of pixel values representative of the document data;
determining respective variances between a range of pixel values of the histogram of pixel values; and
determining whether the additional data is unauthorized data based at least in part on the respective variances.

19. The method of claim 16, further comprising:
determining that the document data includes the additional data;
using a gradient computation algorithm on the document data to determine a set of gradients in a first plane and in a second plane; and
determining whether the additional data is unauthorized data based at least in part on the set of gradients.

20. The method of claim 16, further comprising:
determining the first data size by,
identifying an indicator in the document data, the indicator containing information corresponding to the first data size of the document data, and
analyzing the document data up to the first data size provided by the indicator; or
generating a copy of the document data, and
determining a size of the document data, the size corresponding to the first data size.

* * * * *